(12) United States Patent
Zhou et al.

(10) Patent No.: US 7,297,181 B2
(45) Date of Patent: Nov. 20, 2007

(54) PURIFICATION AND TRANSFILLING OF AMMONIA

(75) Inventors: Derong Zhou, Doylestown, PA (US);
John P. Borzio, Robbinsville, NJ (US);
Mindi Xu, Naperville, IL (US);
Hwa-Chi Wang, Naperville, IL (US);
Tran Vuong, Richardson, TX (US)

(73) Assignees: Air Liquide America L.P., Houston, TX (US); American Air Liquide Inc., Fremont, CA (US)

( * ) Notice: Subject to any disclaimer, the term of this patent is extended or adjusted under 35 U.S.C. 154(b) by 283 days.

(21) Appl. No.: 11/009,510

(22) Filed: Dec. 13, 2004

(65) Prior Publication Data

US 2006/0005704 A1    Jan. 12, 2006

Related U.S. Application Data

(60) Provisional application No. 60/586,028, filed on Jul. 7, 2004.

(51) Int. Cl.
*C01C 1/02* (2006.01)
*B01D 53/04* (2006.01)

(52) U.S. Cl. .............................. 95/11; 95/125; 95/143; 96/111; 96/132; 96/134; 203/DIG. 16; 222/318; 222/399

(58) Field of Classification Search .................. 95/11, 95/117, 121, 123, 125, 143, 148, 273; 96/111, 96/121, 130, 132, 133, 134, 413; 203/41, 203/DIG. 16; 62/617; 417/207
See application file for complete search history.

(56) References Cited

U.S. PATENT DOCUMENTS 3,186,795 A * 6/1965 Rice et al. ................... 423/352

3,404,072 A    10/1968 Bollen et al.
3,551,102 A    12/1970 Hettick et al.

(Continued)

FOREIGN PATENT DOCUMENTS

DE          159259 A3    3/1983

(Continued)

OTHER PUBLICATIONS

PCT International Search Report for PCT/IB2005/001339.

(Continued)

*Primary Examiner*—Frank M. Lawrence
(74) *Attorney, Agent, or Firm*—Christopher J. Cronin; Brandon S. Clark

(57) ABSTRACT

An ammonia purification system includes a hydrocarbon removal station that removes hydrocarbons from gaseous ammonia via adsorption, a moisture removal station that removes water from gaseous ammonia via adsorption, and a distillation station including a distillation column connected with a condenser to facilitate removal of impurities from ammonia and condensation of gaseous ammonia to form a purified liquid ammonia product. The system further includes a storage tank to receive purified ammonia, a remote station connected with the storage tank, and a vaporizer connected with the storage tank. The vaporizer is configured to receive and vaporize liquid ammonia from the storage tank and deliver gaseous ammonia back to the storage tank so as to facilitate pumping of the ammonia to the remote station based upon a vapor pressure established within the storage tank.

16 Claims, 1 Drawing Sheet

U.S. PATENT DOCUMENTS

| | | | |
|---|---|---|---|
| 3,803,858 A * | 4/1974 | Simon | 62/50.2 |
| 4,049,782 A | 9/1977 | Wöhler et al. | |
| 4,060,591 A | 11/1977 | Garber et al. | |
| 4,148,866 A | 4/1979 | Becker | |
| 4,200,496 A | 4/1980 | Stein | |
| 4,263,145 A | 4/1981 | Wirth, Jr. | |
| 4,318,782 A | 3/1982 | Pagani et al. | |
| 5,385,275 A * | 1/1995 | Billet | 222/399 |
| 5,385,689 A | 1/1995 | Tom et al. | |
| 5,427,759 A | 6/1995 | Heitmann | |
| 5,496,778 A | 3/1996 | Hoffman et al. | |
| 5,644,921 A * | 7/1997 | Chowdhury | 62/48.1 |
| 5,716,588 A | 2/1998 | Vergani et al. | |
| 5,833,758 A | 11/1998 | Linn et al. | |
| 5,924,291 A * | 7/1999 | Weiler et al. | 62/50.2 |
| 5,968,232 A | 10/1999 | Whitlock | |
| 6,004,433 A | 12/1999 | Borzio et al. | |
| 6,254,735 B1 | 7/2001 | Watzenberger | |
| 6,277,246 B1 | 8/2001 | Borzio et al. | |
| 6,365,006 B1 | 4/2002 | Aristovich et al. | |
| 6,461,411 B1 | 10/2002 | Watanabe et al. | |
| 6,524,544 B1 | 2/2003 | Alvarez, Jr. et al. | |
| 6,534,027 B2 | 3/2003 | Dershowitz et al. | |
| 6,547,861 B2 | 4/2003 | Funke et al. | |
| 6,576,138 B2 | 6/2003 | Sateria et al. | |
| 6,733,734 B2 | 5/2004 | Watanabe et al. | |
| 2001/0010286 A1 | 8/2001 | Wostbrock et al. | |
| 2003/0033936 A1 | 2/2003 | Funke et al. | |
| 2003/0126867 A1 * | 7/2003 | Drube et al. | 62/50.2 |
| 2004/0091413 A1 | 5/2004 | Otsuka et al. | |
| 2005/0034479 A1 * | 2/2005 | Ji et al. | 62/617 |
| 2005/0120877 A1 * | 6/2005 | Wu et al. | 95/117 |

FOREIGN PATENT DOCUMENTS

| | | |
|---|---|---|
| EP | 0 088 478 A1 | 9/1983 |
| EP | 0 784 595 B1 | 7/1997 |
| EP | 1214965 A | 6/2002 |
| JP | 2003-183021 * | 7/2003 |
| JP | 2003183021 | 7/2003 |
| WO | WO 97/06104 A1 | 2/1997 |

OTHER PUBLICATIONS

Journal of Materials Science: Materials in Electronics 9 (1998), pp. 127-132; "Adsorption of Diborane and Hydrogen Selenide on Porous Alumina and Silica", Watanabe, et al.

Journal of Crystal Growth 124 (1992), pp. 272-277, North Holland; "The Elimination of $H_2O$ and $SiH_4$ in $AsH_3$", Ikeda, et al.

* cited by examiner

PURIFICATION AND TRANSFILLING OF AMMONIA

CROSS-REFERENCE TO RELATED APPLICATIONS

This application claims priority from U.S. Provisional Patent Application Ser. No. 60/586,028, entitled "System and Method For Purifying Ammonia and Ammonia Product Purified Thereby", and filed Jul. 7, 2004. The disclosure of this provisional patent application is incorporated herein by reference in its entirety.

BACKGROUND OF INVENTION

1. Field of Invention

The present invention pertains to methods and apparatus for purifying ammonia to obtain an ultra-pure ammonia product, particularly for use in semiconductor manufacturing and related applications.

2. Related Art

Ammonia is typically utilized in the manufacture of electronic devices such as semiconductor chips, light emitting diodes (LEDs) and flat panel display devices, as a source of nitrogen for depositing thin nitride films during formation of the particular device (e.g., tantalum nitride, titanium nitride, gallium nitride and silicon nitride). For example, in the production of semiconductor chips with copper interconnections, a barrier layer of a metal nitride is typically formed by the reaction of a metal precursor (e.g., titanium, tantalum or silicon) with ammonia gas to prevent the migration of copper into regions adjacent the interconnections.

Ammonia gas must be substantially and extremely pure when used in such manufacturing processes to prevent impurities from forming within the metal nitride film layers deposited on the devices being manufactured. Even trace amounts of impurities present in the deposited films can deteriorate film quality and performance. For example, trace amounts of oxygen in ammonia gas (e.g., 10 parts per billion (ppb) or less) used for manufacture of LED devices can cause lattice defects and are detrimental to band gap properties that are desirable for LED performance. Trace impurities of other components in the ammonia gas, such as moisture or water, hydrocarbons and carbon oxides (e.g., carbon dioxide), are also detrimental and can lead to degradation of the final product if present in the nitride films being formed. Further, certain impurities like moisture are very difficult to remove from ammonia gas to a sub parts per million (ppm) level.

At present, commercially available purifiers capable of removing moisture from ammonia at ppb levels are often very expensive and are not suitable for large scale processing flows of about 100 liters per minute (lpm) or greater. As consumer demand for high technology products involving semiconductor, LED and flat panel manufacturing processes increases, so too will the need for ultra-high purity of ammonia in multi-tonnage quantities and that can be produced in an efficient and economical manner. Ammonia purification systems must be capable of tolerating variability of incoming crude or commercial grade ammonia streams for processing and of reducing a variety of impurities without generating secondary impurities. Such systems should further include adsorbent materials that can be repeatedly regenerated to effectively remove moisture and/or other contaminants at sub ppm levels. Further, the handling of ammonia including transfilling of tanks or cylinders must be carried out carefully to prevent or substantially minimize the potential for metallic contamination of the purified ammonia.

Accordingly, there exists a need to provide a system capable of providing ammonia at ultra-high purity levels and in large (e.g., multi-tonnage) quantities while being both efficient and economical.

SUMMARY OF THE INVENTION

It is an object of the present invention to provide ammonia at ultra-high purity levels and on a large commercial supply (e.g.,multi-tonnage) scale.

It is another object of the present invention to provide ammonia at ultra-high purity levels that is efficient and economical.

It is a further object of the present invention to provide an ammonia transfilling process and system that maintains ammonia at ultra-high purity levels as it is delivered to a desired location.

The aforesaid objects are achieved individually and/or in combination, and it is not intended that the present invention be construed as requiring two or more of the objects to be combined unless expressly required by the claims attached hereto.

In accordance with one embodiment of the present invention, an ammonia purification system includes a hydrocarbon removal station that removes hydrocarbons from gaseous ammonia via adsorption, a moisture removal station that removes water from gaseous ammonia via adsorption, and a distillation station including a distillation column connected with a condenser to facilitate removal of impurities from ammonia and condensation of gaseous ammonia to form a purified liquid ammonia product.

In accordance with another embodiment of the present invention, a method of purifying ammonia in a system includes the steps of: providing a supply of crude gaseous ammonia to the system, providing a hydrocarbon removal station to remove hydrocarbons from gaseous ammonia via adsorption, providing a moisture removal station to remove water from gaseous ammonia via adsorption, providing a distillation station comprising a distillation column connected with a condenser to facilitate removal of impurities from ammonia and condensation of gaseous ammonia to form a purified liquid ammonia product, and directing the crude gaseous ammonia through at least one of the hydrocarbon removal station, the moisture removal station and the distillation station.

Preferably, a plurality of fluid flow lines connect the hydrocarbon removal station, the moisture removal station and the distillation station to each other to provide a plurality of alternative flow paths of ammonia through one or more stations during system operation. In addition, a plurality of ammonia tanks are provided in the system and include vaporizers to vaporize liquid ammonia within the tanks so as to establish a selected vapor pressure within the tanks. The established vapor pressure in the tanks facilitates pumping of ammonia to other parts of the system due to a pressure differential that exists between each tank and the destination for ammonia flow.

In yet another embodiment of the present invention, a medium transporting system includes a storage tank including a liquid medium, a remote station connected with the storage tank, and a vaporizer connected with the storage tank. The vaporizer is configured to receive and vaporize the liquid medium from the storage tank and deliver gaseous medium back to the storage tank so as to facilitate pumping of the medium in a gaseous or liquid state to the remote station based upon a vapor pressure established within the storage tank.

In still another embodiment of the present invention, a method of transporting a fluid medium while maintaining the purity of the fluid medium includes the steps of: providing a storage tank including the medium in a liquid state, providing a vaporizer connected with the storage tank, the vaporizer being configured to receive and vaporize the liquid medium from the storage tank and deliver gaseous medium back to the storage tank to establish a selected vapor pressure within the storage tank, and pumping the fluid medium to a remote station connected with the storage tank due to a pressure differential established between the storage tank and the remote site as a result of the established vapor pressure within the storage tank.

In a further embodiment of the present invention, a method of reconditioning a packed bed including calcium sulfate saturated with water includes the following steps: flowing a heated gas through the packed bed at a plurality of consecutively increasing temperatures and for selected time intervals to remove water from the calcium sulfate while increasing pore sizes and adsorbent capacity of the calcium sulfate, and rapidly cooling the calcium sulfate after the heating steps to maintain the increased adsorbent capacity for the calcium sulfate.

The ammonia purification and transfilling processes and systems of the present invention are capable of purifying commercial grade ammonia feed supplied at varying purity levels (e.g., 99.0% and lower) to ultra-high purity levels of 99.9995% and higher. The system is further capable of delivering the ultra-high purity ammonia to other processes and/or storage sites while maintaining the purity of the ammonia.

The above and still further objects, features and advantages of the present invention will become apparent upon consideration of the following detailed description of specific embodiments thereof, particularly when taken in conjunction with the accompanying drawing.

DESCRIPTION OF PREFERRED EMBODIMENTS

Figure 1:
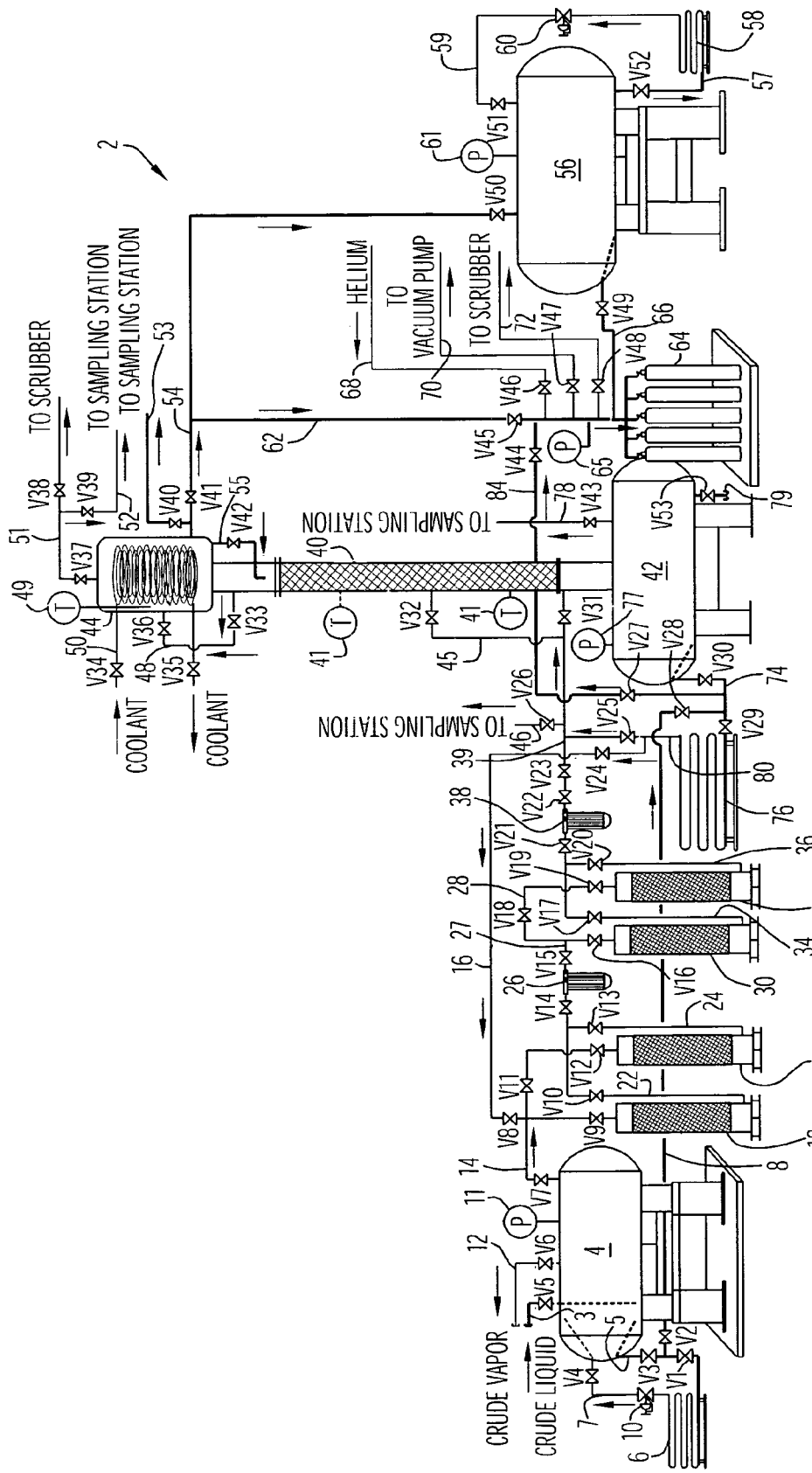
FIG. 1 is a diagram of an exemplary embodiment of an ammonia purification and transfilling system in accordance with the present invention.

In accordance with the present invention, an ammonia purification and transporting/transfilling system receives crude ammonia from a supply source (e.g., a supply tank) and includes a number of different purification units including, without limitation, adsorption units for removing hydrocarbons from ammonia, chemical sorption and adsorption units for removing water or moisture from ammonia, and one or more distillation units to remove light gas impurities from ammonia. The purification units can be arranged in the system in any suitable manner, with two or more of the same types of units being aligned in series and/or in parallel to facilitate processing of ammonia at multiple flow rates as well as maintaining system operation when one or more purification units are inactivated or brought offline (e.g., for regeneration of the units). The system is capable of purifying crude ammonia supplied at wide range of purity levels (e.g., 99.0% and lower) to ultra-high purity levels of 99.9995% and higher so as to render the purified ammonia product suitable for use in semiconductor, LED, flat panel and/or other electronic manufacturing processes.

The system further utilizes transfilling equipment that facilitates the transport of the purified ammonia to various locations within the system as well as locations remote from the system while maintaining the ammonia in its ultra-high purified state. In particular, the system includes storage tanks linked with external vaporizers, where the vaporizers establish suitable pressure differentials within the tanks and corresponding flow lines to facilitate pumping and transfer of the ammonia during system operation. The transfilling system design eliminates the need for mechanical (e.g., rotary) pumps, which can introduce impurities into the ammonia product, and/or pumping with expensive inert gases (e.g., helium or argon). In particular, the transfilling system ensures purity of the ammonia product (i.e., by preventing or substantially minimizing the introduction of secondary contamination to the ammonia product) while minimizing system operating costs during transport of the ultra-high purified ammonia product.

The system and corresponding processes of the present invention are designed for flexibility and are capable of operating in batch, semi-continuous and/or continuous modes depending upon a number of factors such as the process flowrate of ammonia required, the purity level and/or amounts of different contaminants existing in the crude ammonia supply, etc. The system and corresponding processes are further designed for optimization and minimization of effluent emissions to the air and surrounding environment. The moisture adsorbent units include an enhanced design and regeneration process as described below that, when properly reconditioned, facilitate multiple regeneration cycles and repeated usage of the adsorbent material within the units without reducing the absorbent capabilities of the units.

An exemplary ammonia purification and transfilling system in accordance with the present invention is depicted in FIG. 1. In particular, system 2 includes a crude ammonia supply source, a series of purification units or stations interconnected with supply lines to facilitate a number of different fluid flow paths for ammonia streams to be processed within the system, and a purified ammonia storage and transfilling system including storage cylinders and a product tank disposed downstream from the supply source and the purification units.

A crude ammonia tank 4 supplies ammonia to the system and receives crude liquid ammonia from a supply source (not shown) via an inlet line 3, where the inlet line 3 includes a valve V5 to selectively control the flow of liquid ammonia into the tank. The liquid ammonia can be supplied from any suitable source including, without limitation, an ammonia production facility connected with system 2 or other supply sources (e.g., transport tankers, etc.). The crude ammonia provided to tank 4 can be at any purity level (e.g., 99.0% or lower). However, regardless of the purity level, the crude ammonia typically contains contaminants such as lubricants and other hydrocarbons that may have originated in the ammonia manufacturing process and/or handling of the ammonia prior to delivery to tank 4. The hydrocarbons, moisture and any other contaminants must be removed by system 2 to render the ammonia at an ultra-high purity level (e.g., 99.9995% purity or higher) and thus suitable for use in the manufacture of electronic components as noted above.

A vaporizer 6 is connected with the crude ammonia tank 4, via fluid lines 5 and 7, to facilitate the flow of liquid ammonia from the tank, through the vaporizer and back into the tank as a vapor or gas so as to increase the vapor pressure within the tank to a selected value. The various vaporizers as described herein may be heat exchangers of any suitable types that serve to heat and vaporize the liquid ammonia to a selected temperatures and pressures in order to facilitate the flow of vaporized ammonia at desired flow rates and vapor pressures to other locations within or outside of the system. The fluid line 5, which delivers liquid ammonia from tank 4 to vaporizer 6, includes two valves V3 and V1 disposed along the line that are selectively manipulated to adjust the flow of ammonia through the line. In addition, a branched flow line 8 extends from flow line 5 at a location between valves V3 and V1 to another flow line 74 and serves as a bypass line for system 2 (as described in further detail below). The branched flow line 8 includes a valve V2 that is selectively manipulated to adjust the flow of ammonia through line 8 toward flow line 74 during system operation.

Fluid line 7 delivers vaporized or gaseous ammonia from vaporizer 6 to tank 4 and includes a valve V4 disposed along the line that is selectively manipulated to adjust the flow of ammonia vapor back into the tank. Fluid line 7 further includes a regulator 10 disposed along the line between vaporizer 6 and valve V4. The regulator serves to prevent further flow of ammonia from the vaporizer to the crude ammonia tank once a threshold pressure is reached that corresponds with the maximum desired vapor pressure for ammonia within tank 4. A pressure sensor 11 is also provided to monitor the pressure within tank 4, and a crude ammonia vapor outlet line 12 is provided along with a valve V6 disposed along the line and that is manipulated to selectively remove ammonia vapor from the tank as desired and to adjust the vapor pressure within tank 4 according to system requirements.

A supply line 14 is connected to an outlet of tank 4 to provide crude ammonia vapor or gas to a first purification station that removes oils and other hydrocarbons from the ammonia stream. Referring to FIG. 1, the first purification station includes a pair of hydrocarbon removal beds, where the hydrocarbon removal beds are preferably packed beds including a commercially available activated granular carbon that is suitable for removing the hydrocarbons present in the ammonia. However, any one or more other suitable types of hydrocarbon purification units may be provided in the system to remove the hydrocarbons from the ammonia. A valve V7 is disposed within line 14 and is selectively manipulated to adjust the flow of ammonia vapor from tank 4 as desired during system operation.

Supply line 14 intersects with a backflow line 16 at a location downstream from valve V7, with backflow line 16 extending between a first hydrocarbon removal bed 18 and a flow line 80 located downstream from supply line 14 (as described in further detail below). The backflow line 16 includes valves V8 and V9 disposed along the backflow line and on opposing sides of the intersection point between supply line 14 and line 16. Supply line 14 further extends beyond the intersection point with line 16 to a second hydrocarbon removal bed 20 and includes a pair of valves V11 and V12 disposed in line 14 between the intersection point of lines 14 and 16 and the inlet of bed 20. An outlet line 22 extends from first hydrocarbon removal bed 18 toward a second purification station, with a pair of valves V10 and V14 disposed in line 22 upstream from the second purification station and selectively manipulated to adjust the flow of ammonia vapor from the hydrocarbon removal beds to the second purification station. Similarly, an outlet line 24 including a selectively controlled valve V13 extends from second hydrocarbon removal bed 20 and connects with outlet line 22 at a location between valves V10 and V14.

As can be seen from the system configuration described above and depicted in FIG. 1, valves V8, V9, V10, V11, V12 and V13 can be selectively and independently manipulated to open or closed positions to facilitate the flow of crude ammonia vapor from tank 4 to one of beds 18 and 20 or, alternatively, to both beds simultaneously. Thus, the system permits alternating flow between the two beds 18 and 20 to divert fluid flow to one bed when the other becomes saturated and needs to be brought offline for regeneration. Alternatively, depending upon system requirements, both beds can be used simultaneously to permit larger fluid processing flows.

Flow line 22 extends beyond valve V14 to an inlet of a particulate filter 26. The filter 26 is of any suitable type capable of filtering particulate material that may become entrained with the ammonia vapor leaving the beds 18 and 20 prior to moisture removal at the second purification station. Preferably, the pore screen size of filter 26 retains carbon and/or other particulate material of a size as small as about 0.03 micrometers (microns) or even smaller from the ammonia stream passing through the filter.

A flow line 27 extends from the outlet of filter 26 and includes a valve V15 that is selectively manipulated to control the flow of fluid to the second purification station. Flow line 27 connects at a T-type intersection with a flow line 28 extending between the inlets of a pair of water removal units 30 and 32 of the second purification station. Flow line 28 includes selectively controlled valves V16, V18 and V19 disposed along the line, where valve V16 is located between the inlet to unit 30 and the intersection of lines 27 and 28, valve V18 is located between the intersection of lines 27 and 28 and the inlet to unit 32, and valve V19 is located between valve V18 and the inlet to unit 32.

Each of the water removal units 30 and 32 include an adsorbent material to remove moisture from the ammonia stream passing through the unit. Preferably, the water removal units include calcium sulfate (e.g., commercially available from W. A. Hammond Drierite Co., Ltd., Xenia, Ohio) to remove water from the ammonia via adsorption and chemical sorption. However, any other suitable adsorbent or dessicant material may be utilized to remove moisture from the ammonia stream.

An outlet line 34 extends from first water removal unit 30 toward a third purification station, with a pair of valves V17 and V21 disposed in line 34 upstream from the third purification station and selectively manipulated to adjust the flow of ammonia vapor from the water removal units to the third purification station. Similarly, an outlet line 36 including a selectively controlled valve V20 extends from second water removal unit 32 and connects with outlet line 34 at a location between valves V17 and V21.

As can be seen from the system configuration described above and depicted in FIG. 1, valves V16, V17, V18, V19, V20 and V21 can be selectively and independently manipulated to open or closed positions to facilitate the flow of ammonia vapor from filter 26 to one of water removal units 30 and 32 or, alternatively, to both units simultaneously. Thus, the system permits alternating flow between the two units 30 and 32 to divert fluid flow to one unit when the other becomes saturated with moisture and needs to be brought offline for regeneration. Alternatively, depending upon system requirements, both units can be used simultaneously to permit larger fluid processing flows. A unique and highly effective regeneration method and corresponding apparatus for restoring a saturated water removal unit to render it suitable for reuse is described below.

Flow line 34 extends beyond valve V21 to a particulate filter 38. The filter 38 filters fine particulate material (e.g., calcium sulfate dust) that is entrained in the ammonia stream emerging from the water removal units 30 and 32. Preferably, the pore screen size of filter 38 is small enough to filter particulate material as small as about 0.03 microns or even smaller from the ammonia stream. A flow line 39 extends from the outlet of filter 38 to a third purification station. A pair of selectively controlled valves V22 and V23 are disposed along line 39.

The third purification station includes a distillation column 40 connected with a distillation tank 42 disposed at the lower end outlet of the column, where tank 42 receives liquid ammonia that is refluxed through the column. In addition, a condenser 44 is disposed at an upper end outlet of the column and is configured to receive purified ammonia vapor and condense the vapor to liquid for further processing as described below. Distillation column 40 separates contaminants or impurities from the ammonia. In particular, light gaseous impurities, such as oxygen, nitrogen, carbon monoxide, carbon dioxide, etc., are separated from ammonia and are collected in the head space of condenser 44 and removed during system operation. Any suitable number of temperature sensors (e.g., sensors 41 as depicted in FIG. 1) can be disposed at any suitable locations along the distillation column to provide information regarding the internal temperature at such locations within the column.

Flow line 39 extends to a first inlet proximate the lower end or base of column 40 and includes a valve V31 that is selectively manipulated to control the flow of the ammonia stream into the first column inlet. A branch line 45 extends from flow line 39 at a location upstream from valve V31 and extends to a second inlet of column 40 that is separated a suitable distance from the first inlet. For example, the second inlet can be located about half way up the length of the distillation column (as depicted in FIG. 1), or any other suitable location along the column. In addition, the column can include any suitable number of inlets (e.g., three or more) disposed at varying locations along the column. A valve V32 is disposed along branch line 45 and is selectively manipulated to control the flow of the ammonia stream into the second column inlet. Thus, valves V31 and V32 can be selectively controlled to adjust the amount of ammonia that enters the first and second inlets of the column depending upon the amount of impurities or contaminants that remain in the ammonia flowing through flow line 39.

A sampling line 46 branches from flow line 39 at a location between valves V23 and flow line 45, where sampling line 46 includes a valve V26 that is selectively manipulated to open and closed positions to facilitate the drawing of an ammonia gas sample for detection of impurity concentrations in the gas stream. The sampling line 46 extends to a sampling station (not shown). The sampling station can include any one or more analyzers to measure the concentrations of one or more impurities that may be present in the ammonia stream, such as moisture or light gas impurities as noted above. In an exemplary embodiment, the sampling station includes a moisture analyzer to determine the moisture content in the ammonia gas stream, and the measured data can be used to control ammonia flow through the water removal units (e.g., alternate the process flow from one unit to another, increase or decrease process flow, etc.). Alternatively, or in addition to measuring moisture content, the sampling station may include one or more gas chromatographs to measure the concentrations of oxygen, nitrogen, hydrocarbons, etc. in the ammonia stream, and the measured data can be used to determine the flow path of ammonia gas through one or both of the first and second inlets to the distillation column. The measured impurity data can also be utilized to control the flow of ammonia through one or both hydrocarbon removal beds of the first purification station.

A flow line 48 extends from an outlet near the top of the column to an inlet of condenser 44. The flow line 48 includes a pair of valves V33 and V36 that are selectively manipulated to control the flow of ammonia vapor exiting column 40 and traveling into the condenser.

Condenser 44 includes a coolant coil 50 that extends through the condenser and includes valves V34 and V35 at the inlet and outlet locations of the coil to selectively control the flow of coolant through the coil during system operation. A suitable coolant medium (e.g., chilled water, glycol, liquid nitrogen, etc.) is circulated through coil 50 to control the operating temperature within the condenser within a selected range so as to maximize the liquefaction and separation of impurities from the ammonia vapor entering the condenser. Preferably, the operating temperature within the condenser is controlled within a range of about −70° F. to about 35° F. (about −56.7° C. to about 1.67° C.) to facilitate removal of light gaseous impurities as noted above from liquefied ammonia within the condenser. A temperature sensor 49 measures the temperature within condenser 44 to facilitate precise temperature control within the condenser during system operation.

Impurity gases, such as the light gaseous impurities note above, are removed from condenser 44 via a vent line 51. The vent line 51 includes a pair of valves V37 and V38 that are selectively manipulated to vent the gases from the condenser for delivery to a scrubber or other processing station (not shown). In addition, a sample line 52 branches from vent line 51 at a location between valves V37 and V38 and extends to a sampling station (not shown) for measuring the concentration of the impurities (e.g., via one or more gas chromatographs). A valve V39 is disposed along sample line 52 and is selectively manipulated to facilitate the extraction of a gas sample into the sample line at varying times during system operation.

A flow line 54 is connected to the condenser outlet for transporting liquefied and purified ammonia from the condenser to storage locations and/or directly to manufacturing and/or other processes, and a valve V41 is disposed along flow line 54 to selectively control the flow rate of liquid ammonia product flowing through this line. A return or reflux line 55 is also connected between condenser 44 and a top portion of column 40, with a valve V42 disposed along line 55 to selectively control the amount of liquid ammonia (e.g., some, all or none) that is refluxed back to the column.

A sampling line 53 branches from flow line 54 at a location between the condenser outlet and valve V41. Sampling line 53 includes a valve V40 disposed within the line that is selectively manipulated to control the flow of a liquid ammonia sample to a sampling station (not shown). The sampling station can include any suitable number of analyzers (e.g., gas chromatographs) to measure the amount of impurities in the purified liquid ammonia product.

Flow line 54 extends to an inlet of a product ammonia storage tank 56. A valve V50 is disposed along flow line 54 downstream from valve V41 and near the storage tank inlet and is selectively manipulated to control the flow of purified liquid ammonia entering the storage tank. Storage tank 56 is configured to collect a sufficient amount of purified ammonia prior for storage prior to delivery to another site for use in a manufacturing or other process. A vaporizer 58 is connected to storage tank 56, via fluid lines 57 and 59, to facilitate the flow of liquid ammonia from the tank, through the vaporizer and back into the tank as a vapor so as to increase the vapor pressure within the tank to a selected value. The fluid line 57, which delivers liquid ammonia from tank 56 to vaporizer 58, includes a valve V52 disposed along the line that is selectively manipulated to adjust the flow of ammonia through the line. Fluid line 59 delivers vaporized ammonia from vaporizer 58 to tank 56 and includes a valve V51 disposed along the line that is selectively manipulated to adjust the flow of ammonia vapor back into the tank. Fluid line 59 further includes a regulator 60 disposed along line 59 between vaporizer 58 and valve V51. The regulator serves to prevent the further flow of ammonia from the vaporizer to the product ammonia tank once a threshold pressure is reached that corresponds with the maximum desired vapor pressure for ammonia within tank 56. A pressure sensor 61 is also provided to monitor the pressure within tank 56.

A flow line 62 branches from flow line 54 at a location between valves V41 and V50 and extends to a filling station 64. The flow line 62 includes a valve V45 disposed along the line that is selectively manipulated to control the flow of ammonia through the line to the filling station. Filling station 64 includes a manifold piping network connected to a series of cylinders. A pressure sensor 65 is connected to line 62 to monitor the pressure of ammonia product traveling through the line. Thus, flow line 62 facilitates the direct filling of liquid ammonia from condenser 44 into the cylinders at station 64. Alternatively, liquid ammonia can also be transported from product ammonia tank 56 via a supply line 66 connected to an outlet of tank 56 and flow line 62 at a location proximate filling station 64. Supply line 66 includes a valve V49 disposed along the line that is selectively manipulated to control the flow of liquid ammonia from tank 56 to filling station 64. The pressure within tank 56 is controlled by the ammonia vapor pressure, which is in turn controlled by operation of vaporizer 58, and this controls the flow rate of liquid ammonia from tank 56 to filling station 64.

A gas pump line 68 is connected to flow line 62 at a location downstream from valve V45, and a valve V46 is disposed along line 68 and is selectively manipulated to control the flow of gas through this line. The gas pump line utilizes an inert gas (e.g., helium) to pump liquid ammonia as necessary from line 62 into the cylinders at filling station 64. In addition, a vacuum pump line 70 and scrubber line 72, each including selectively controlled valves V47 and V48, are also connected to flow line 62 at locations downstream from the connection between pump line 68 and flow line 62 to facilitate selective vacuum withdrawal of and/or scrubbing of material removed from the cylinders at filling station 64.

Referring again to the third purification station, distillation tank 42 includes an outlet connected to a flow line 74, which in turn extends to a vaporizer 76. A pair of valves V29 and V30 are disposed within flow line 74 and are selectively manipulated to control the flow of liquid ammonia from tank 42 to vaporizer 76. A sampling line 78, including a selectively controlled valve V43, is also connected to tank 42 to facilitate selective withdrawal of ammonia vapor samples for analysis at a sampling station (not shown). The sampling station can include any suitable number of analyzers to measure the content of any one or more impurities (e.g., moisture, hydrocarbons, oxygen, nitrogen, etc.) within the ammonia gas sample. A pressure sensor 77 is also connected to tank 42 to monitor the pressure within the tank. A further flow line 79 is connected to a second outlet of distillation tank 42 and includes a valve V53 disposed along the line to facilitate selective removal of ammonia from the tank through line 79 as desired.

A flow line 80 connects an outlet of vaporizer 76 to flow line 39 at a location between valve V23 and sampling line 46. A valve V25 is disposed along flow line 80 and is selectively manipulated to control the flow of ammonia vapor from vaporizer 76 to flow line 39 for travel into one or more inlets of distillation column 40 as described above. In addition, a flow line 84 is connected between flow line 74 (at a location between valves V29 and V30) and flow line 62 (at a location downstream from valve V45). A pair of valves V27 and V44 are disposed along flow line 84 and are selectively manipulated to selectively divert the flow of liquid ammonia from distillation tank 42 directly to filling station 64 during system operation.

As noted above, backflow line 16 extends between and connects flow line 80 with flow line 14. A valve V24 is disposed along backflow line 16 between the intersection of lines 16 and 80 and valve V8, and valve V24 is selectively manipulated to divert the flow of ammonia vapor to the first purification station (i.e., instead of flowing to the distillation column via lines 80 and 39) during system operation.

As further noted above, flow line 8 extends from flow line 5 (at crude ammonia tank 4) to flow line 74 (at a location between the connection point of lines 74 and 84 and valve V29) to facilitate a bypass of crude ammonia from the first and second purification stations for transport directly to the third purification station during system operation. A valve V28 is disposed along flow line 8 at a location proximate the connection point between lines 8 and 74 and is selectively manipulated to control the flow of liquid ammonia to vaporizer 76 prior to delivery to distillation column 40 (via lines 80 and 39).

The system described above and depicted in FIG. 1 is designed for flexibility and includes a number of modes of operation, where the ammonia stream can be routed in different circuits to bypass purification stations as desired and depending upon a particular application and the types of purification that are required. The system can be operated at any suitable temperatures and pressures that are desired for a particular application. The various modes of system operation are described as follows.

Initially, crude ammonia liquid is delivered into crude ammonia tank 4 via line 3. A portion of the crude ammonia in tank 4 is vaporized, by opening valves V3, V1 and V4, and flowing crude ammonia through line 5, into vaporizer 6, and through line 7 back into tank 4. Once the vapor pressure within tank 4 is within a suitable range, valves V3, V1 and V4 are closed, and crude ammonia (in vapor or liquid form) can be delivered or pumped to other parts of the system (via line 14 or line 8) as a result of the pressure differential established between the vapor pressure in tank 4 and other parts of the system. As the vapor pressure starts to drop within tank 4, valves V3, V1 and V4 are again opened to facilitate vaporization of ammonia within the tank to increase the vapor pressure. The vaporization of the crude ammonia with vaporizer 6 also purifies the crude ammonia by removing certain contaminants such as metal oxides that may exist in the ammonia prior to delivery to the purification stations.

In a batch purification mode, crude ammonia vapor is delivered from tank 4 to the first purification system by opening valve V7 and one or more of valves V9, V10, V11, V12 and V13 (while valves V2 and V8 are closed), depending upon whether the ammonia vapor is to be directed through first and/or second hydrocarbon removal beds 18 and 20. For example, the ammonia stream can be initially routed through bed 18 (by opening valves V9 and V10 and closing valves V1, V12 and V13). When bed 18 becomes saturated, the ammonia stream can then be diverted to bed 20 (by closing valves V9 and V10 and opening valves V11, V12 and V13). This allows continuous processing of ammonia at the first purification station while permitting regeneration or reconditioning of the saturated bed. Alternatively, as noted above, both beds 18 and 20 can be employed simultaneously for purifying the ammonia vapor stream (by opening valves V9, V10, V11, V12 and V13). The hydrocarbon removal beds of the first purification station are preferably operated at ambient or room temperature to effectively remove hydrocarbons from the ammonia vapor stream.

In an exemplary embodiment, a saturated hydrocarbon removal bed is reconditioned by flowing ultra pure nitrogen (e.g., at about 15-25 psig or about 103.4-172.4 kPa) through the bed and then to a scrubber (not shown in FIG. 1). The reconditioning temperature within the bed undergoing reconditioning is preferably maintained at about 300-350° C. for a sufficient period of time (e.g., up to 50 hours depending upon the size of the bed).

Upon leaving the first purification station, the ammonia vapor stream is substantially free of hydrocarbons and is delivered to particulate filter 26, where carbon and/or other particulate material entrained with the ammonia and of a size of about 0.03 microns or smaller is removed from the ammonia vapor stream by the filter. The ammonia vapor stream is then delivered to the second purification station via flow line 27.

At the second purification station, the ammonia vapor is further purified by removing moisture from the ammonia at one or both water removal units 30 and 32. For example, ammonia vapor can be initially routed through unit 30 by opening valves V16 and V17 and closing valves V18, V19 and V20. When unit 30 becomes saturated with moisture, the ammonia flow can be diverted to unit 32 by closing valves V16 and V17 and opening valves V18, V19 and V20. As with the first purification station, the configuration of the second purification station permits selective diverting of ammonia flow between units 30 and 32 to facilitate bringing a saturated unit offline for reconditioning while maintaining ammonia flow through the second purification station. In addition, both units 30 and 32 can also be used simultaneously to purify ammonia vapor as desired (by opening valves V16, V17, V18, V19 and V20). The water removal units are preferably operated at room temperature. A preferred method for reconditioning water saturated beds in accordance with the present invention is described below.

Ammonia vapor emerging from the second purification station is directed via flow line 34 to particulate filter 38, where fine particulate material (e.g., calcium sulfate dust) entrained in the ammonia stream is removed as the ammonia flows through the filter. The filtered ammonia vapor stream is then delivered to the third purification station via flow line 39. As noted above, a sampling line 46 is disposed along flow line 39 to selectively divert a sample from the ammonia stream to a sampling station, where any one or more impurities in the ammonia vapor (e.g., moisture, hydrocarbons, oxygen, nitrogen, etc.) within the stream are detected to facilitate flow control of the ammonia stream through beds 18 and 20, units 30 and 32, and/or to inlet locations disposed along distillation column 40 (i.e., via lines 39 and 45).

The ammonia vapor stream is directed to the first and/or second outlets of distillation column 40 (by selective manipulation of valves V31 and V32 to open and closed positions), where the flow of ammonia entering the column through each of lines 39 and 45 is selectively controlled based upon the impurity content of the ammonia stream. Ammonia vapor traveling upward through column 40 enters condenser 44, via flow line 48, where light gaseous impurities (e.g., nitrogen, oxygen, carbon dioxide, etc.) are concentrated in the head space of the condenser and separated from liquefying ammonia. The condenser is preferably operated at about −57° C. to about 2° C. to facilitate separation of the light gas impurities from liquid ammonia. Coolant is flowed through flow line 50 within the condenser to maintain operating conditions at the desired temperature.

Ammonia liquid that has been condensed in condenser 44 is refluxed, either partially or completely during the batch purification mode, back into column 40 via flow line 55. The refluxed liquid ammonia accumulates in distillation tank 42. The entire batch purification process, including transfer of crude vapor ammonia through the first and second purification systems and into distillation column 40, is carried out until a suitable amount of liquid ammonia has accumulated in distillation tank 42 (e.g., about 90 kg).

Upon collecting a suitable amount of liquid ammonia in tank 42, delivery of crude ammonia vapor through the first and second purification stations and into column 40 is suspended (e.g., by closing valve V7 to prevent flow of ammonia from tank 4 to the first purification station), and purification of the collected ammonia is carried out solely at the distillation column. In particular, valve V30 of flow line 74 is opened to allow liquid ammonia to flow from tank 42 at a selected flow rate to vaporizer 76. Vaporizer 76 is operated to deliver ammonia vapor at a suitable vapor pressure and flow rate back to distillation column 40 via the first and/or second outlets (by selective control of valves V31 and V32). The amount of vaporized ammonia entering the column via flow line 39 and/or flow line 45 can be selectively controlled, for example, based upon the measured concentration of impurities in the ammonia as measured by extracted samples of ammonia in tank 42 via sampling line 78.

In addition to delivering ammonia vapor at a suitable flow rate to the distillation column, vaporizer 76 further removes certain impurities that may exist in the liquid ammonia when ammonia is transformed to a vapor. At any time during the process of recirculation of liquid ammonia from tank 42 back to column 40, the suspended process of delivering crude ammonia vapor from tank 4 to tank 42 (as described above) can be re-initiated. For example, when the weight of liquid ammonia in the distillation tank drops below a threshold value, crude vaporized ammonia feed can be directed from tank 4 to the first and second purification stations, with the ammonia eventually passes through distillation column 40 to condenser 44 and then to distillation tank 42.

Ammonia that is liquefied in condenser 44 can be delivered to product ammonia tank 56 and/or filling station 64, via the various flow lines as described above. Optionally, any selected portion of liquid ammonia from the condenser can be refluxed back to distillation column 40, depending upon the purity level of the ammonia as determined, for example, by ammonia samples extracted by sampling line 53 from the purified liquid ammonia product flowing in line 54. In addition, depending upon the purity level of the purified liquid ammonia product collected in distillation tank 42 (which can be determined by extraction of a sample from tank 43 via sampling line 78 as described above), this purified ammonia can also be transported directly to filling station 64 via flow line 84 (upon opening valves V27 and V44).

The gaseous impurities in the condenser that separate from the liquefied ammonia are removed via flow line 51 (by opening valves V37 and V38) and delivered to a scrubber as described above. The condenser is designed to provide an adequate headspace for the gaseous impurities to separate from the condensing ammonia liquid so as to facilitate a gaseous phase extraction of the impurities through flow line 51. As more gaseous impurities are vented from the condenser, the distillation time will be reduced, leading to a more efficient production of purified liquid ammonia product for delivery to the filling station and/or product storage tank.

The method described above can also be performed in a continuous mode, depending upon impurity concentration levels within the crude ammonia and whether some or any reflux is required to achieve the desired ultra high purity level for the ammonia product. For example, in situations where light gas impurities within the crude ammonia feed are on the order of a hundred ppm rather than a thousand ppm, reflux flow line 55 can be closed (i.e., by closing valve V42) so as to permit liquefied ammonia product from condenser 44 to flow directly to filling station 64 and/or product ammonia tank 56. Thus, the system operates to continuously flow ammonia through the first, second and third purification stations and then to storage and/or manufacturing or other process systems.

In another modification to the batch purification process described above, crude ammonia can be diverted so as to bypass the first and second purification stations and be transported directly to the third purification station. This mode of operation is useful in situations where the crude ammonia is substantially free of certain hydrocarbons and/or moisture thus obviating the need to process the ammonia at the first and second purification stations. In this purification process, valves V1, V7, V23, V24, V27 and V29 are closed and valves V3, V2, V28 and V30 are opened to permit filling of distillation tank 42 by transporting ammonia directly from tank 4, through flow lines 8 and 74 and into tank 42. Upon reaching the desired capacity of ammonia within tank 42 (e.g., about 90 kg), valves V3, V2 and V28 are closed, and valves V29, V25, V31 and/or V32 are opened (while valves V23 and V24 remain closed) to permit flow of ammonia liquid from tank 42 through vaporizer 76 and then into distillation column 40. Operation of the distillation column is carried out in the same manner as described above for the previous modes of operation, with reflux of a selected portion (e.g., all, some or none) of liquefied ammonia from the condenser being delivered back into the column while the remaining ultra pure ammonia liquid product is delivered to filling station 64 and/or tank 56. In addition, crude ammonia can be sent directly to vaporizer 76, rather than being accumulated first in distillation tank 42, where ammonia vapor is then transferred in a continuous manner into column 40 for purification to an ultra pure ammonia product.

In situations where it is desirable to distill crude ammonia vapor followed by adsorption of hydrocarbons and moisture remaining in the distilled ammonia, crude liquid ammonia is first directed to distillation column 40 in the manner described above, where it is vaporized and purified in column 40 and condenser 44 until the concentration of light gaseous impurities in the refluxed ammonia liquid in distillation tank 42 is within a suitable range. The liquid ammonia in tank 42 is then directed into vaporizer 76, valve V25 is closed and valves V24 and V8 are opened to permit ammonia vapor to flow through backflow line 16 to the first purification station. The ammonia vapor then flows in a continuous manner through the first, second, and third purification stations in a similar manner as the continuous process described above, and the ultra pure ammonia product emerging from condenser 44 is then directed to filling station 64 and/or product ammonia tank 56.

Each of the ammonia tanks is connected with a vaporizer in the manner described above to facilitate vapor or liquid ammonia delivery and/or transfilling of cylinders without the requirement of mechanical or other pumping mechanisms. The vaporizers are selectively controlled to ensure a suitable vapor pressure exists within the tanks (e.g., that tanks are pressurized by vaporized ammonia to a pressure that is higher than ammonia vapor pressure of ambient or room temperature and/or the pressure is high enough to enable vapor or liquid within the tanks to flow into other designated purification process stations, receiving containers and/or other locations within or remote from the system), which in turn selectively controls the flow rate of ammonia vapor or liquid from the tanks per processing requirements. In particular, for every 1 lb. (454 g) of ammonia vapor that is withdrawn from a tank, approximately 600 BTU (633 kJ) of heat energy is lost from the tank. Accordingly, heat must be supplied to the tanks as vaporized ammonia is being withdrawn in order to maintain the desired vapor pressure within the tanks, and thus a suitable pressure differential between each tank and the desired location to where the ammonia is to be pumped. The back pressure regulator utilized for each vaporizer (as described above) prevents the tank to which it is connected from being over pressurized, thus providing a safety shut-off feature to prevent the flow of vaporized ammonia from the vaporizer back to the tank once a threshold pressure for the pressure regulator is reached.

As noted above, the pumping of ultra pure ammonia by mechanical devices can introduce metal particulates, hydrocarbon lubricants and/or other impurities into the ammonia stream. Further, using inert gases like helium or argon can be extremely expensive, resulting in more expensive operating costs. The transfilling system of the present invention, which utilizes the vapor pressure of the ammonia to establish a suitable pressure differential so as to pump liquid or vaporized ammonia to a desired location, is highly effective in minimizing system costs and reducing the introduction of potential impurities into the ultra pure ammonia product. In addition, as noted above, the vaporization of crude ammonia in tank 4 further separates certain impurities (such as metal oxides) that may exist in the crude liquid ammonia from the crude vaporized ammonia prior to purification of the crude vaporized ammonia at any of the purification stations. Referring to crude ammonia tank 4, crude ammonia vapor is delivered from tank 4 to the first purification station via line 14. Alternatively, crude liquid ammonia can be delivered directly to distillation tank 42 or vaporizer 76, via line 8, in situations where it is desirable to at least initially bypass the first and second purification stations. Vaporizer 6 controls the vapor pressure within tank 4 to facilitate delivery of either crude ammonia vapor or crude ammonia liquid at selected flow rates to the varying locations within the system during the purification process. Similarly, vaporizer 76 controls the vapor pressure within distillation tank 42 to facilitate delivery of ammonia vapor to distillation column 40 or ammonia liquid to filling station 64 (via line 84) at selected flow rates. Ammonia product tank 56 is also connected with vaporizer 58 to control the vapor pressure within tank 56 so as to facilitate pumping of ultra pure liquid ammonia to filling station 64 (via flow line 66) or to any other suitable locations (e.g., directly to a semiconductor or other manufacturing process) at desired flow rates during system operation. Thus, the transport and transfilling of gaseous and liquid ammonia to various locations within the system, to storage/filling locations and to other sites (e.g., manufacturing processes) is carried out in a manner that prevents or substantially minimizes contamination of the ammonia with secondary contaminants during system operation.

The system described above and depicted in FIG. 1 can be manually or automatically controlled to selectively alternate flow paths and flow rates of vaporized and liquid ammonia through the system. For example, the valves can be independently and automatically manipulated to open and closed positions (e.g., via pneumatic controls), and any one or more suitable programmable logic controllers can be provided to facilitate automated opening and closing of valves disposed within the system during any of the batch and continuous modes of operation as described above. The controller or controllers can communicate in any suitable manner (e.g., via electrical wiring and/or wireless connections) with any of the valves, pressure and temperature sensors, and analyzers at any of the sampling stations. Thus, the controller or controllers can be programmed to selectively control the vapor pressure in each of the ammonia tanks, as well as the flow of ammonia at any suitable flow rates and in any suitable flow paths as described above based upon pressure and/or temperature data measured within the tanks or distillation column as well as measured impurities concentration data that is determined at one or more sampling stations.

In another embodiment of the present invention, a reconditioning process is implemented to restore the moisture removal units of the second purification station after becoming saturated with water. It is desirable that the adsorbent material is capable of removing trace amounts of moisture from ammonia in an economical and effective manner and also maintaining its absorbent properties upon being reconditioned. An exemplary adsorbent material that is suitable for use in the moisture removal units of the present invention is a calcium sulfate particulate product commercially available from W. A. Hammond Drierite Co., Ltd. (Xenia, Ohio).

An exemplary moisture removal unit includes a container constructed of a suitable material (e.g., a 6 inch schedule 90 316L stainless steel pipe sealed with flanges and including a 1 inch inlet and outlet). The unit is packed with calcium sulfate particulate product. When the moisture removal unit becomes saturated, it is brought offline (e.g., in the manner described above) and subjected to a reconditioning process involving a gradual heating of the adsorbent bed with substantially pure nitrogen continuously flowing through the unit.

A preferred reconditioning process, which involves slow and continuous heating followed by rapid cooling via a flow of substantially pure nitrogen, includes the following consecutively performed steps: (1) heat the calcium sulfate packed bed to about 100° C. for about 12 hours; (2) heat the bed to about 150° C. for about 24 hours; (3) heat the bed to about 200° C. for about 36 hours; (4) heat the bed to about 250° C. for about 48 hours; (5) heat the bed to about 300° C. for about 48 hours; (6) heat the bed to about 350° C. for about 48 hours; and (7) rapidly cooling the bed to room temperature (about 25° C.).

During this slow and continuous heating process, moisture and other volatile compounds are removed from the surfaces of the particulate adsorbent material in the bed, resulting in a reorganization or rearrangement of lattice structures of the adsorbent material. The rearrangement of the lattice structures further results in the shifting or reshaping and even enlargement of pores within the packed bed of adsorbent material, which increases overall pore surface area and volume and thus adsorption capacity within the packed bed. The newly developed pore structure that forms from the slow, continuous heating process is maintained within the packed bed by rapidly cooling the bed from 350° C. to room temperature (e.g., with liquid nitrogen or gaseous nitrogen at a selected temperature). After the packed bed has reached room temperature, the adsorbent material can be further treated to remove any solid residuals (e.g., metal oxides, carbonates, etc.) that may exist in the material. Such residuals are removed by flowing ammonia vapor at a selected pressure (e.g., about 30-50 psig or 206-345 kPa) into the packed bed and holding the ammonia therein for a suitable time (e.g., about 3 to 5 hours). The ammonia vapor is then vented from the packed bed, and substantially pure nitrogen is then continuously flowed through the unit at a selected heating cycle. A preferred heating/cooling cycle using a continuous flow of substantially pure nitrogen includes the following consecutively performed steps: (1) heat the bed to about 150° C. for about 24 hours; (2) heat the bed to about 250° C. for about 24 hours; (3) heat the bed to about 350° C. for about 24 hours; and (4) rapidly cooling the bed to room temperature (about 25° C.). For example, the rapid cooling may be conducted over a period of minutes (e.g., 10 minutes or less).

The reconditioning process as described above renders the moisture removal beds highly effective for repeated usage of the packed adsorbent material disposed within the units. In particular, the reconditioned calcium sulfate is capable of reducing moisture content in the ammonia at concentrations of about 50 ppm and higher to purified concentrations of about 0.5 ppm or less.

Thus, the systems and various methods described above are capable of providing ultra-high purified ammonia (e.g., a purity of 99.9995% or higher) from crude ammonia and also transport the ammonia in an efficient and economical manner, without the use of mechanical pumps or expensive inert gases, while maintaining the ultra-high purity of the ammonia. Concentrations of impurities such as metal oxides, moisture, hydrocarbons and light gaseous impurities can be lowered in the ammonia from ppm levels to ppb levels. In addition, the reconditioning of calcium sulfate in the moisture removal beds enables continual re-use of the calcium sulfate without losing the adsorbent capabilities within the beds.

The purity of ammonia can be sampled in both the gas and liquid state at a variety of locations within the system to determine the effectiveness of the purification process as well as whether process flows need to be re-routed within the system in any of the above described flow paths. Purified liquid ammonia can be partially or completely loaded into the product ammonia tank, cylinders at the filling station and/or delivered directly to a point-of-use site (e.g., a manufacturing process) depending upon the quality of the ammonia emerging from the condenser. This results in a high rate of production of ultra-high purity ammonia.

In addition, the system described above and depicted in FIG. 1 can be modified to facilitate the flow of ammonia in any suitable variety of flow paths through one or more of the different purification stations. For example, the system could be modified such that crude ammonia could be fed directly to any of the purification stations (e.g., directly to the moisture removal station). Further, any suitable number of bypass or flow diverting lines can be implemented to alternate flow of ammonia through any one or more purification stations and in any consecutive order. For example, the system could be modified to facilitate the flow of ammonia through the second purification station, followed by flow through the first purification station and then through the third purification station.

Having described novel systems and methods for the purification and transfilling of ammonia, it is believed that other modifications, variations and changes will be suggested to those skilled in the art in view of the teachings set forth herein. It is therefore to be understood that all such variations, modifications and changes are believed to fall within the scope of the present invention as defined by the appended claims.

The invention claimed is:

1. An ammonia purification system, comprising:
   a hydrocarbon removal station that removes hydrocarbons from gaseous ammonia via adsorption;
   a moisture removal station that removes water from gaseous ammonia via adsorption;
   a distillation station comprising a distillation column connected with a condenser to facilitate removal of impurities from ammonia and condensation of gaseous ammonia to form a purified liquid ammonia product;
   a distillation tank in fluid communication with the distillation column; and
   a vaporizer connected between an outlet of the distillation tank and at least one inlet of the distillation column to facilitate vaporization of liquid ammonia received from the distillation tank and transport of the vaporized ammonia back to the distillation column at a selected flow rate.

2. The system of claim 1, further including a reflux line connecting an outlet of the condenser to the distillation column wherein the reflux line is configured to transfer at least a portion of purified liquid ammonia product from the condenser for travel through the distillation column and into the distillation tank.

3. An ammonia purification system, comprising:
   a hydrocarbon removal station that removes hydrocarbons from gaseous ammonia via adsorption;
   a moisture removal station that removes water from gaseous ammonia via adsorption;
   a distillation station comprising a distillation column connected with a condenser to facilitate removal of impurities from ammonia and condensation of gaseous ammonia to form a purified liquid ammonia product;
   a crude ammonia tank configured to deliver crude ammonia directly to at least one of the hydrocarbon removal station, the moisture removal station and the distillation station;
   a vaporizer connected with the crude ammonia tank; and
   wherein the vaporizer is configured to receive and vaporize crude liquid ammonia from the crude ammonia tank and deliver crude gaseous ammonia back to the crude ammonia tank.

4. An ammonia purification system, comprising:
   a hydrocarbon removal station that removes hydrocarbons from gaseous ammonia via adsorption;
   a moisture removal station that removes water from gaseous ammonia via adsorption;
   a distillation station comprising a distillation column connected with a condenser to facilitate removal of impurities from ammonia and condensation of gaseous ammonia to form a purified liquid ammonia product;
   a storage tank disposed downstream from the condenser and configured to receive purified liquid ammonia product from the condenser; and
   a vaporizer connected with the storage tank; wherein the vaporizer is configured to receive and vaporize purified liquid ammonia product from the storage tank and deliver purified gaseous ammonia back to the storage tank so as to establish a selected vapor pressure within the storage tank for pumping of purified liquid ammonia product to a remote site.

5. The system of claim 4, wherein the remote site comprises a filling station including a plurality of cylinders connected with the storage tank.

6. An ammonia purification system, comprising:
   a hydrocarbon removal station that removes hydrocarbons from gaseous ammonia via adsorption;
   a moisture removal station that removes water from gaseous ammonia via adsorption;
   a distillation station comprising a distillation column connected with a condenser to facilitate removal of impurities from ammonia and condensation of gaseous ammonia to form a purified liquid ammonia product;
   a storage tank including liquid ammonia;
   a receiving station connected with the storage tank; and
   a vaporizer connected with the storage tank;
   wherein the vaporizer is configured to receive and vaporize liquid ammonia from the storage tank and deliver gaseous ammonia back to the storage tank so as to establish a selected vapor pressure within the storage tank for delivering ammonia in a gaseous or liquid state to the receiving station.

7. The system of claim 6, wherein the receiving station is configured to store ammonia or to deliver ammonia to at least one container.

8. A method of purifying ammonia in a system, comprising:
   providing a supply of crude gaseous ammonia to the system;
   providing a hydrocarbon removal station to remove hydrocarbons from gaseous ammonia via adsorption;
   providing a moisture removal station to remove water from gaseous ammonia via adsorption;
   providing a distillation station comprising a distillation column connected with a condenser to facilitate removal of impurities from ammonia and condensation of gaseous ammonia to form a purified liquid ammonia product; and
   directing a flow of ammonia through at least one of the hydrocarbon removal station, the moisture removal station and the distillation station;
   wherein the moisture removal station comprises a plurality of adsorbent beds arranged within the system so as to facilitate selective alternating of ammonia fluid flow from one adsorbent bed to another adsorbent bed as ammonia is directed through the moisture removal station; and
   wherein each of the adsorbent beds of the moisture removal station includes calcium sulfate, ammonia is directed through a first adsorbent bed of the moisture removal station, and the method further comprises:
   upon saturation of the first adsorbent bed with a selected amount of water, bringing the first adsorbent bed offline by diverting the flow of ammonia through a second adsorbent bed; and
   flowing a medium through the first adsorbent bed to heat the calcium sulfate within the first adsorbent bed to a plurality of progressively higher temperatures for selected time periods followed by rapid cooling of the calcium sulfate within the first adsorbent bed to a cooled temperature.

9. A method of purifying ammonia in a system, comprising:
providing a supply of crude gaseous ammonia to the system;
providing a hydrocarbon removal station to remove hydrocarbons from gaseous ammonia via adsorption;
providing a moisture removal station to remove water from gaseous ammonia via adsorption;
providing a distillation station comprising a distillation column connected with a condenser to facilitate removal of impurities from ammonia and condensation of gaseous ammonia to form a purified liquid ammonia product; and
directing a flow of ammonia through at least one of the hydrocarbon removal station, the moisture removal station and the distillation station;
extracting at least one sample of ammonia from at least one sampling line disposed at a selected location within the system; and
measuring a concentration of at least one impurity in the at least one extracted ammonia sample via an analyzer;
wherein the distillation column includes a plurality of inlets disposed at varying locations along the distillation column, and the directing of the flow of ammonia includes directing gaseous ammonia into at least one of the inlets of the distillation column based upon the measured concentration of the at least one impurity in the at least one extracted sample.

10. A method of purifying ammonia in a system, comprising:
providing a supply of crude gaseous ammonia to the system;
providing a hydrocarbon removal station to remove hydrocarbons from gaseous ammonia via adsorption;
providing a moisture removal station to remove water from gaseous ammonia via adsorption;
providing a distillation station comprising a distillation column connected with a condenser to facilitate removal of impurities from ammonia and condensation of gaseous ammonia to form a purified liquid ammonia product; and
directing a flow of ammonia through at least one of the hydrocarbon removal station, the moisture removal station and the distillation station;
wherein the distillation station further comprises a distillation tank in fluid communication with the distillation column, and a reflux line connected between the condenser and the distillation column, and ammonia is directed through the distillation station by:
directing gaseous ammonia through the distillation column;
forming purified liquid ammonia product within the condenser;
directing a selected amount of the purified liquid ammonia product from the condenser, through the reflux line and the distillation column to the distillation tank;
wherein the directing of the ammonia further includes:
directing crude gaseous ammonia through the hydrocarbon removal station; directing gaseous ammonia exiting from the hydrocarbon removal station through the moisture removal station; and directing gaseous ammonia exiting from the moisture removal station through the distillation station so as to accumulate purified liquid ammonia product in the distillation tank; and
upon accumulating the selected amount of purified liquid ammonia product in the distillation tank, stopping the flow of crude gaseous ammonia through the hydrocarbon and moisture removal stations; directing purified liquid ammonia product from the distillation tank through a vaporizer to form purified gaseous ammonia product; and directing the purified gaseous ammonia product into at least one inlet of the distillation column.

11. A method of purifying ammonia in a system, comprising:
providing a supply of crude gaseous ammonia to the system;
providing a hydrocarbon removal station to remove hydrocarbons from gaseous ammonia via adsorption;
providing a moisture removal station to remove water from gaseous ammonia via adsorption;
providing a distillation station comprising a distillation column connected with a condenser to facilitate removal of impurities from ammonia and condensation of gaseous ammonia to form a purified liquid ammonia product; and
directing a flow of ammonia through at least one of the hydrocarbon removal station, the moisture removal station and the distillation station;
wherein the providing of crude gaseous ammonia to the system includes:
directing a selected amount of crude liquid ammonia from a crude ammonia tank into a vaporizer to form crude gaseous ammonia; and
directing the crude gaseous ammonia back into the crude ammonia tank to establish a selected vapor pressure within the crude ammonia tank that forces ammonia from the crude ammonia tank to at least one of the hydrocarbon removal station, the moisture removal station and the distillation station.

12. A method of purifying ammonia in a system, comprising:
providing a supply of crude gaseous ammonia to the system;
providing a hydrocarbon removal station to remove hydrocarbons from gaseous ammonia via adsorption;
providing a moisture removal station to remove water from gaseous ammonia via adsorption;
providing a distillation station comprising a distillation column connected with a condenser to facilitate removal of impurities from ammonia and condensation of gaseous ammonia to form a purified liquid ammonia product; and
directing a flow of ammonia through at least one of the hydrocarbon removal station, the moisture removal station and the distillation station;
wherein the system further comprises a storage tank disposed within the system to receive purified liquid ammonia product from the condenser, and the method further comprises: directing a selected amount of purified liquid ammonia product from the storage tank through a vaporizer to form purified gaseous ammonia product; and directing the purified gaseous ammonia product back into the product tank to establish a selected vapor pressure within the product tank that forces purified liquid ammonia product from the product tank to a remote site.

13. The method of claim 12, wherein the remote site comprises a filling station including a plurality of cylinders connected with the storage tank.

14. The method of claim 12, wherein the remote site comprises an electronic component manufacturing system.

15. A method of purifying ammonia in a system, comprising:
  providing a supply of crude gaseous ammonia to the system;
  providing a hydrocarbon removal station to remove hydrocarbons from gaseous ammonia via adsorption;
  providing a moisture removal station to remove water from gaseous ammonia via adsorption;
  providing a distillation station comprising a distillation column connected with a condenser to facilitate removal of impurities from ammonia and condensation of gaseous ammonia to form a purified liquid ammonia product; and
  directing a flow of ammonia through at least one of the hydrocarbon removal station, the moisture removal station and the distillation station; and further comprising:
  providing a storage tank including liquid ammonia; and
  providing a vaporizer connected with the storage tank, the vaporizer being configured to receive and vaporize liquid ammonia from the storage tank and deliver gaseous ammonia back to the storage tank to establish a selected vapor pressure within the storage tank; and directing ammonia in a gaseous or liquid state from the storage tank to a receiving station due to a pressure differential established between the storage tank and the receiving station as a result of the vapor pressure within the storage tank.

16. The method of claim 15, wherein the receiving station is configured to store ammonia or deliver ammonia to at least one container.

* * * * *